United States Patent
Lutz et al.

(10) Patent No.: US 7,403,651 B2
(45) Date of Patent: Jul. 22, 2008

(54) PLASTIC BODY IN THE FORM OF A FILM, FOR EXAMPLE A TRANSFER FILM OR LAMINATING FILM, OR PROVIDED WITH SUCH A FILM AND A PROCESS FOR THE PRODUCTION OF A MULTI-COLOR IMAGE ON OR IN SUCH A PLASTIC BODY

(75) Inventors: Norbert Lutz, Rückersdorf (DE); Gerhard Zinner, Pyrbaum (DE)

(73) Assignee: Leonhard Kurz GmbH & Co. KG, Furth (DE)

( * ) Notice: Subject to any disclaimer, the term of this patent is extended or adjusted under 35 U.S.C. 154(b) by 692 days.

(21) Appl. No.: 10/399,842

(22) PCT Filed: Nov. 2, 2001

(86) PCT No.: PCT/DE01/04154

§ 371 (c)(1),
(2), (4) Date: Aug. 25, 2003

(87) PCT Pub. No.: WO02/36356

PCT Pub. Date: May 10, 2002

(65) Prior Publication Data

US 2004/0043308 A1    Mar. 4, 2004

(30) Foreign Application Priority Data

Nov. 4, 2000  (DE) ................. 100 54 803
Nov. 4, 2000  (DE) ................. 100 54 805
Aug. 13, 2001 (DE) ................. 101 39 720

(51) Int. Cl.
G06K 9/00   (2006.01)
G03F 7/00   (2006.01)

(52) U.S. Cl. ............... 382/162; 430/9; 430/200

(58) Field of Classification Search ........... 382/162, 382/167; 358/500, 501, 510; 430/9, 14, 430/293, 320, 200
See application file for complete search history.

(56) References Cited

U.S. PATENT DOCUMENTS 4,523,777 A   6/1985   Holbein et al. ............ 283/167

(Continued)

FOREIGN PATENT DOCUMENTS

DE   G 81 30 861.2   1/1983

(Continued)

Primary Examiner—Duy M Dang (57) ABSTRACT

A process for the production of a multi-color image is described. Preferably a transfer film is used which has a laser-sensitive layer (4). The laser-sensitive layer (4) comprises a three-component mixture. The components are coloring agents which are bleachable with laser radiation, in particular pigments, for example cyan pigment, magenta pigment and yellow pigment.

With the process the procedure is such that in the individual steps only a respective one of the pigment components is bleached insofar as the laser conditions which are respectively specific to the various pigment components are set. This means that in the case of the three-component mixture only a first component is bleached by laser treatment of a given location in a first step by laser irradiation and only one other component is bleached in an optional second step and only one third component is bleached in an optional third step. The color at the location in question is afforded in each case by subtractive color mixing of the remaining unbleached components.

16 Claims, 11 Drawing Sheets

U.S. PATENT DOCUMENTS

| | | | |
|---|---|---|---|
| 4,911,302 A | 3/1990 | Butler | 200/459 |
| 4,956,702 A | 9/1990 | McQuade et al. | 358/500 |
| 6,617,094 B2 * | 9/2003 | Ozawa et al. | 430/270.1 |
| 6,631,208 B1 * | 10/2003 | Kinjo et al. | 382/167 |

FOREIGN PATENT DOCUMENTS

| | | |
|---|---|---|
| DE | 37 38 330 A1 | 5/1988 |
| DE | 41 31 964 A1 | 4/1993 |
| DE | 43 33 546 A1 | 4/1995 |
| DE | 44 10 431 A1 | 9/1995 |
| DE | 195 22 397 A1 | 1/1997 |
| EP | 0 190 997 A2 | 8/1986 |
| EP | 0 219 011 A2 | 4/1987 |
| EP | 0 327 508 A2 | 8/1989 |
| EP | 0 416 664 A1 | 3/1991 |
| EP | 0 420 261 A2 | 4/1991 |
| EP | 0 537 668 A2 | 4/1993 |
| EP | 0 741 370 A1 | 11/1996 |
| GB | 2 240 948 A | 8/1991 |
| WO | WO 94/12352 | 6/1994 |
| WO | WO 96/35585 | 11/1996 |
| WO | WO 98/19868 | 5/1998 |

* cited by examiner

PLASTIC BODY IN THE FORM OF A FILM, FOR EXAMPLE A TRANSFER FILM OR LAMINATING FILM, OR PROVIDED WITH SUCH A FILM AND A PROCESS FOR THE PRODUCTION OF A MULTI-COLOR IMAGE ON OR IN SUCH A PLASTIC BODY

This application claims priority based on an International Application filed under the Patent Cooperation Treaty, PCT/DE01/04154, filed on Nov. 2, 2001, and German Patent Application Nos. 100 54 803.2, filed on Nov. 4, 2000; 100 54 805.9, filed on Nov. 4, 2000; and 100 39 720.8, filed on Aug. 13, 2001.

BACKGROUND OF THE INVENTION

The invention concerns a plastic body in the form of a film, for example a transfer film, in particular a hot stamping film, or a laminating film or provided with such a film, as set forth in the classifying portion of claim 1, and a process for the production of a multi-color image on or in such a plastic body.

WO 96/35585 discloses various configurations of plastic bodies and more specifically solid bodies or coatings which respectively contain a mixture of various pigments. In the embodiments described therein the pigment mixture is composed of three pigment components, more specifically a yellow pigment, a magenta pigment and a cyan pigment. Color marking is effected on the plastic body by laser treatment. The color marking is produced by bleaching of the pigments with the laser treatment. The laser conditions are respectively set specifically with variations in the wavelength to obtain given colors. The respective specific wavelength used is previously ascertained by light absorption measurements on the pigments, and more specifically the absorption wavelength at the absorption maximum of the pigment is ascertained in each case. Pigments are used which have only a single absorption maximum. That is intended to ensure that the laser treatment produces a color which corresponds to the laser light and the duration of the laser treatment and the intensity of the laser light can be of the same value for each color. In the described embodiments with the pigment mixture consisting of yellow pigment, magenta pigment and cyan pigment, the laser treatment involves using violet laser light at a wavelength of 430 nm, blue laser light at a wavelength of 470 nm, yellow laser light at a wavelength of 575 nm and laser light which is referred to as orange at a wavelength of 650 nm. In that way the aim is to produce various color markings on the plastic body by means of the laser treatment by suitable adjustment of the laser wavelength with the laser conditions being otherwise the same. The colors are produced by complex mixing of the pigments which are bleached at the same time at the respective laser wavelength. A disadvantage is that no method is specified, with which all colors could be produced.

WO 98/19868 describes a correspondingly operational process for producing color markings, which however involves using special yellow, magenta and cyan pigments, which more specifically can be activated by way of UV light in a first step and are bleached only in a subsequent second step.

DE 199 55 383 A2 which is not a prior publication describes a process for producing color markings by laser treatment, which operates using a two-coordinate beam deflection device with a focusing device, employing a special mirror device. The body to be marked has a mixture of cyan pigment, magenta pigment and yellow pigment, those pigments being selectively bleached by red laser light, green laser light or blue laser light. An essential point is that this process does not provide for using a film, preferably a multi-layer film, in the form of a transfer film or in the form of a laminating film or such a film applied to a substrate.

It is also known from WO 94/12352 to produce bright color markings on a plastic body which includes a pigment mixture and which can be in the form of a solid body or a coating, by laser treatment using different wavelengths. The coloring effect is implemented by virtue of the pigments altering their color by color change when the laser treatment is carried out. The laser conditions are randomly selected in each case. A process for specifically producing any colors is also not specified here. The number of colors produced in this way is greatly limited.

EP 0 327 508 discloses a process in which a laser-sensitive dyestuff A and a laser-insensitive dyestuff B are contained in two separate mutually superposed layers or alternatively in a common layer and the dyestuff A is bleached by laser treatment while the dyestuff B is not bleached or is bleached only slightly. A color marking is obtained with the laser treatment. The process does not provide for any variation in the laser conditions in respect of wavelength and only a single-color marking, that is to say at a maximum a two-color image, is to be produced in this fashion.

EP 0 190 997 B1 discloses a process in which a plastic plate or a plastic layer in the form of a coating on a metal flake contains an additive which is intended to discolor upon laser treatment, more specifically either by color change from one color to another or by transformation to black. It is not possible with that process to produce color markings involving different colors.

DE 37 38 330 A1 discloses a laser inscription process for use in relation to surfaces with a pigment coating, wherein pigments of the pigment coating change their internal molecular structure at different temperatures, and produce different colors. The specific surface temperatures are locally achieved with the laser irradiation effect, thereby producing colored laser markings.

GB 2 240 948 A also describes laser inscription of identity cards. Here laser inscription is effected by the removal of different color layers. The laser marking produced in that case appears as a colored marking.

DE 41 31 964 A1 describes laser inscription of a multi-layer film with a metal layer and a hologram structure. The inscription operation is effected by region-wise destruction of the metal layer bearing the hologram.

EP 0 420 261 discloses a hot stamping film with a hologram structure, which is individualised by way of laser treatment for the purposes of safeguarding it against forgery. A change in material or color or removal of portions in the layer structure of the film is effected by means of the laser beam. This procedure does not involve multi-color marking.

EP 0 416 664 B1 discloses producing black markings by a laser marking operation in plastic bodies or film layers. The marking is produced by laser-induced blackening of the laser-sensitive component molybdenum sulfide contained in the plastic material.

DE 44 10 431 describes a process with which person-related data are applied to an identity card by laser inscription, the identity card having an anti-copying element applied by a transfer process. In the laser inscription procedure, an identification in the form of a row of digits is applied by a portion of the row of digits being produced in the anti-copying element and a further portion of the row of digits being applied in an adjoining region of the identity card. Laser inscription is effected by way of local demetallisation in the metal layer of the anti-copying element or by blackening of the treated region of the identity card respectively.

EP 0 219 011 B1 describes a special process for laser inscription on identity cards. In this process, black markings are produced in different transparent layers of the card by means of a laser. Parallactic images are produced in that way in the mutually co-operating transparent layers.

It is known from DE 195 22 397 A1 to produce bright inscription by laser treatment of plastic layers containing pigments. That is effected by laser bleaching of the pigments contained therein.

It is further known for example from EP 0 537 668 and DE 813 08 61 U1 for layers in the layer structure of transfer films to be removed in a region-wise manner by laser treatment in order in that way to produce inscriptions therein.

It is also known for example from EP 0 741 370 B1, DE 43 33 546 A1 or U.S. Pat. No. 4,911,302 to produce markings by laser treatment of laminate bodies, by laser-induced melting of the material, in order then to transfer those inscriptions while still in the molten state on to another body.

SUMMARY OF THE INVENTION

The object of the present invention is to provide a plastic body of the kind set forth in the opening part of this specification, on or in which a plurality of different color markings can be specifically produced by way of laser treatment, and preferably markings of all desired colors can be produced in the manner of a full-color image. A further object of the invention is to provide a process for the production of such a body.

The invention attains that object with a plastic body as set forth in claim 1 and a process as set forth in claim 9.

The plastic body has a mixture of at least three components, wherein each of those components is respectively a coloring agent, for example a pigment or another coloring agent. The pigments are mostly insoluble, preferably inorganic coloring agents. Other coloring agents are for example organic coloring agents. These are generally soluble. It is possible to use mixtures which as coloring agents have exclusively pigments or exclusively other coloring agents or pigments and other coloring agents. The coloring agents which therefore form the components of the mixture are referred to hereinafter for the sake of brevity as components. It is essential that one or more of the components can be bleached by means of laser under laser conditions which are respectively specific for the component involved. In other words, for bleaching the first component, there is a first laser condition, for example a first specific laser wavelength; for bleaching the second component there is a second laser condition, for example a second specific laser wavelength, and for bleaching the third component there is a third laser condition, for example a third specific laser wavelength. Those specific laser conditions or laser wavelengths used for bleaching the various components are respectively different from each other. They are also so selected that, under the respective specific laser conditions for a component, for example the specific laser wavelength, only that one component or preferably only that one component can be bleached and in that procedure the other components cannot be bleached or substantially cannot be bleached. In that way it is possible for only one respective component to be specifically bleached in a step in the laser treatment, while the others are left unaltered.

If a three-component mixture is used, the color of the body is therefore formed prior to the first step by the three components. After the laser treatment of the first step the color of the body at the treated location is formed by the two components which have not been bleached in the laser treatment of the first step and possibly additionally by the residual color of the component which was bleached to a greater or lesser degree in the first step, depending on the respective treatment involved. Preferably, the coloring effect is produced by subtractive mixing of the components which are present mixed in the plastic body, that is to say in the plastic layer or in the entire solid plastic body. The various components can be present in a layer mixed in closely juxtaposed relationship or mixed in a multi-layer mutually superposed relationship.

The process for the production of a multi-color image on or in such a plastic body provides that in a first step only the one component is bleached by laser irradiation of a location of the plastic body under laser conditions which are specific for one of the for example (three) components, and that in a second step by laser irradiation at the same location of the body, under laser conditions which are specific for a further one of the (three) components, only that further component is bleached. In the first step therefore, besides the bleached first component, there still remain the other (two) unbleached components, so that the color is accordingly formed by those (two) unbleached components, possibly with an incomplete degree of bleaching of the first component in addition with the residual color of the first component which is only bleached to a greater or lesser degree. After the second step in which the second component is bleached there is still only one component remaining—if a three-component mixture was originally used—so that then therefore the color is formed only by that remaining component. That applies for the situation where the other components have been completely bleached in the preceding steps. Otherwise, that is to say with an incomplete degree of bleaching of the first component in the first step and with an incomplete degree of bleaching of the second component in the second step, the color after the second step is additionally formed by the residual color of the first and second components which were only bleached to a greater or lesser degree in the first and second steps.

In addition, provided as an optional third step is the laser treatment of the same location on the body for the third component, that is to say the component which has not previously been bleached, wherein only that third component is bleached at the same location of the plastic body under laser conditions which are specific for that third component, for example a specific laser wavelength. After that third step therefore at the location in question, all three components have been bleached or have been bleached more or less, according to the respective degree of bleaching. Therefore, depending on the possible colored background layer or also possible further components in the plastic body or in the same layer of the plastic body, the above-mentioned location of the plastic body appears colorless or tinted, and in the limit case it appears white when the background is white.

There are also possible further steps, in each of which one or more respective further components is or are bleached, under specific laser conditions. It is preferably provided that in general, in an n-th step, by laser irradiation of the same location of the plastic body, for another further one of n components, only that n-th component is bleached.

Depending on the respective choice of the components and the specific laser conditions it can also be provided that at least one of the components exhibits a color change in the laser irradiation procedure.

In the laser treatment in the individual steps, it is respectively provided that the color change or degree of bleaching to be achieved is adjusted in the laser irradiation procedure by control of the laser conditions, in particular the laser wavelength, the laser intensity and/or the irradiation time.

The laser conditions used in the respective individual steps are preferably experimentally ascertained and/or optimised before carrying out the process, by way of tests with the individual components. The criterion in regard to the choice of the laser conditions is preferably the bleaching result to be achieved. The choice of the laser conditions which are used in relation to the individual steps can be such that the component absorbs light at the wavelength of the laser light used for the bleaching operation, insofar as the component at that wavelength has an absorption maximum, preferably one of a plurality of absorption maxima, or preferably its sole or its greatest absorption maximum. However the choice can also be such that the component absorbs light at the laser light wavelength used for the bleaching operation, but in that case at that wavelength the component does not have an absorption maximum, but rather that wavelength is outside the absorption maximum or outside the absorption maximum of the component.

In order to be able to operate with a pigment mixture with relatively few pigment components but in that case to be able to produce as many colors are possible and preferably all colors, it is advantageous if a component is a cyan pigment and/or a component is a magenta pigment and/or a component is a yellow pigment. Preferably the pigment mixture contains a cyan pigment, a magenta pigment and a yellow pigment. In particular embodiments the pigment mixture involves a mixture with exclusively three pigment components, preferably cyan pigment, magenta pigment and yellow pigment. All colors can be produced with those three colors by subtractive mixing. By specific bleaching of the individual pigment components in the individual steps, it is possible for example to produce blue in the first step if in that first step only or preferably only the yellow pigment component is bleached, or in the first step it is possible to produce green if in that first step only or preferably only the magenta pigment component is bleached or in the first step it is possible to produce red if in that first step only or preferably only the cyan pigment component is bleached. Then, the color cyan, magenta or yellow can be produced in the second step, insofar as a further one of the remaining pigment components which were not bleached in the first step is bleached, that is to say if blue has been produced in the first step and therefore cyan and magenta have not been bleached in the first step, the color cyan can be produced in the second step by bleaching the magenta component in the second step. Production of the other colors is effected in a corresponding manner, for the following applies in regard to subtractive color mixing:

| a) cyan + magenta + yellow | black |
| b) cyan + magenta | blue |
| c) cyan + yellow | green |
| d) yellow + magenta | red |

The color mixture a) is present prior to the laser treatment, that is to say prior to the first step. The plastic body appears black or gray. The color mixture b) or c) or d) is present after the first step, that is to say at the location at which the laser treatment was effected in the first step the plastic body has a blue or a green or a red color marking respectively. After the second step, when thus laser treatment of the second step has been carried out in the second step at the same location, the color marking at that location of the plastic body is in the color cyan or yellow or magenta, depending on which of the two pigment components which were not bleached at that location in the first step have not been bleached in the second step. In order to obtain a colorless or transparent marking in the third step at that location, the third step is then to be carried out at the same location, in which third step therefore the remaining pigment which has not yet been bleached is now bleached with the respective pigment-specific laser conditions.

In that way a respective color marking of any desired color can be respectively produced at each location by successive laser treatment at that same location. It is possible in that way for mutually juxtaposed locations of the plastic body to be successively treated, thereby to produce a multi-color image, preferably a so-called full-color image, on the plastic body by means of mutually juxtaposed color markings.

Instead of the above-described pigment mixture with the pigment components cyan pigment, magenta pigment and yellow pigment, it is also possible to use a corresponding coloring agent mixture with coloring agents which do not represent pigments, that is to say a coloring agent mixture comprising cyan coloring agent, magenta coloring agent and yellow coloring agent as the components involved. In this respect operation can be implemented in the same manner, the laser conditions which are specific for the respective coloring agent being used in the individual steps.

The various systems preferably use pulsed, frequency-multiplied solid-state lasers, optical parametric oscillators (OPOs) and pulsed UV lasers (for example Excimer lasers) for the laser treatment. In the laser treatment the intensity and/or the pulse duration of the laser radiation is preferably so set that a maximum bleaching result or a maximum color change occurs without perceptible damage to the material of the plastic body. The process can be used on solid plastic bodies but also on transfer films, in particular hot stamping films, or on laminating films. The use thereof on transfer or laminating films affords advantages in that those films can be applied to a plurality of materials, for example metals, wood or the like in order to decorate any bodies. The films require only a small amount of coloring agent or pigment as the coloring agents or pigments then only have to be present of a thin layer. When using films it is also possible for bodies of any size to be coated only locally, for example by printing processes.

The laser treatment involves using energy densities of preferably between 0.05 and 0.5 J per $cm^2$ with a pulse duration of between 5 and 20 ns, wherein the bleaching result can also be determined by the number of pulses. The laser-sensitive layer with the pigment mixture can be present on the transfer or laminating foil over the full surface thereof, but also only in region-wise manner.

BRIEF DESCRIPTION OF THE DRAWINGS

Preferred embodiments by way of example are described in greater detail hereinafter with reference to the accompanying Figures in which.

DESCRIPTION OF THE PREFERRED EMBODIMENTS

The films shown in FIGS. 1 through 5 are hot stamping films. The hot stamping film in FIG. 1 includes a carrier film 1, a release layer 2, a protective layer 3, a laser-sensitive layer 4, a background layer 5 and an adhesive layer 6.

Figure 1:
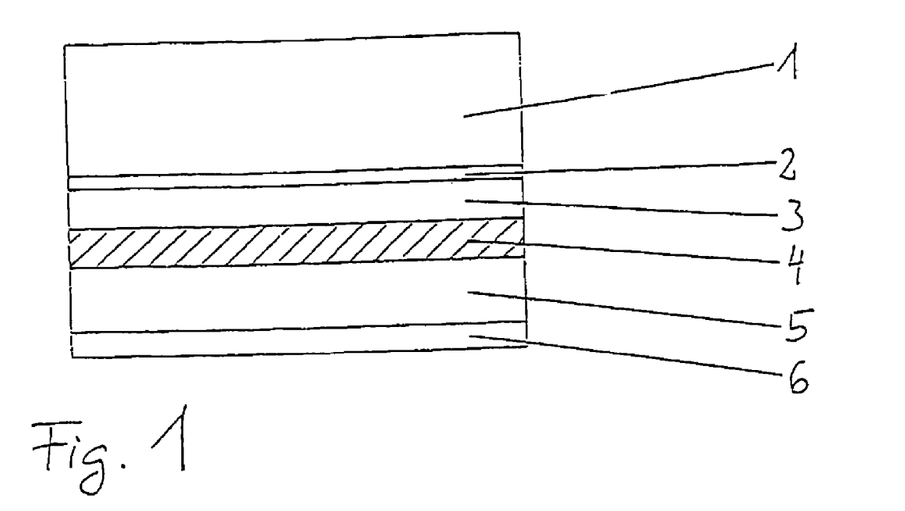
FIGS. 1 through 5 show sectional views of various hot stamping films each with a laser-sensitive layer.

The carrier film 1 is preferably a polyester film of a thickness of between 6 and 100 μm, preferably a thickness of between 19 and 38 μm. The layers 2 through 6 are arranged in superposed relationship on the carrier film 1. They are applied using per se known processes in production of the hot stamping film.

The release layer 2 is a separation layer. It is preferably in the form of a layer which becomes soft when subjected to the action of heat and which, when the hot stamping film is applied to the substrate, permits release of the other layers from the carrier film 1. The release layer 2 is generally of a thickness of at most 1 μm.

The protective layer 3 is in the form of a protective lacquer layer. This involves a transparent lacquer layer, the purpose of which is to substantially protect the free surface of the article decorated with the hot stamping film from mechanical damage and chemical effects. The thickness of the layer is preferably between 1 and 2 μm.

The laser-sensitive layer 4 is in the form of the so-called first color lacquer layer. This involves a lacquer layer of a thickness of preferably between 3 and 10 μm, which is colored by pigments or other coloring agents. The pigments or the other coloring systems or coloring agents of this color lacquer layer can be selectively bleached and/or can be changed in color by color change by means of a laser beam whose wavelength is preferably in the visible range. Preferably the pigment concentration of the lacquer layer 4 is between 3 and 15% with respect to solids. The binding agent system of that lacquer layer 4 may not be altered optically by the action of the laser so that, at the irradiated locations, the result is only a colored contrast marking without perceptible damage to the film. The film is not perceptibly damaged either at the surface or in the interior.

The background layer 5 is in the form of the so-called second color lacquer layer. This layer is colored differently from the laser-sensitive layer 4. The layer 5 is for example white or of an ivory color if the laser-sensitive layer 4 is black or gray. The layer 5 serves primarily as a light backup layer for the colors produced in the laser-sensitive layer 4 by laser radiation. The thickness of the layer 5 is preferably between 5 and 20 μm or 15 and 20 μm.

It is possible that the background layer 5—just like the laser-sensitive layer 4—is not provided over the entire surface area of the hot stamping foil and thus not over the entire surface to be decorated, in the same coloration. On the contrary the layers 4 and 5 can be composed individually—and thus also differently—of regions of different colors.

The adhesive layer 6 involves an adhesive layer which is per se usual and known in relation to transfer films, of a thickness of between about 1 and 10 μm, wherein the adhesive layer for a hot stamping film is of such a composition that it becomes sticky only when subjected to the corresponding action of heat.

The layers 2 through 6 can be produced in accordance with the following compositions:

| Release layer 2 (separation layer): | |
|---|---|
| Toluene | 99.5 parts |
| Ester wax (dropping point 90° C.) | 0.5 part |
| Protective layer 3 (protective lacquer layer): | |
| Methylethylketone | 61.0 parts |
| Diacetone alcohol | 9.0 parts |
| Methylmethacrylate (Tg = 122° C.) | 18.0 parts |
| Polyethylene dispersion (23% in xylene) | 7.5 parts |
| (softening point 140° C.) | |
| High-molecular dispersing additive (40%, amino number 20) | 0.5 part |
| Extender (aluminum silicate) | 4.0 parts |
| Laser-sensitive layer 4 (first color lacquer layer): | |
| Methylethylketone | 34.0 parts |
| Toluene | 26.0 parts |
| Ethylacetate | 13.0 parts |
| Cellulose nitrate (low viscosity, 65% in alcohol) | 20.0 parts |
| Linear polyurethane (freezing point > 200° C.) | 3.5 parts |
| High-molecular dispersing additive (40%, amino number 20) | 2.0 parts |
| e.g.: Pigment Blue 15:4 | 0.5 part |
| Pigment Red 57:1 | 0.5 part |
| Pigment Yellow 155 | 0.5 part |
| Background layer 5 (second color lacquer layer): | |
| Methylethylketone | 40.0 parts |
| Toluene | 22.0 parts |
| Ethylene vinylacetate terpolymer (freezing point = 60° C.) | 2.5 parts |
| Polyvinylchloride (Tg: 89° C.) | 5.5 parts |
| Polyvinylchloride (Tg: 40° C.) | 3.0 parts |
| Dispersing additive (50%, acid number 51) | 1.0 part |
| Titanium dioxide (d = 3.8g4.2 g/cm$^3$) | 26.0 parts |
| Adhesive layer 6: | |
| Methylethylketone | 55 parts |
| Toluene | 12.5 parts |
| Ethanol | 3.5 parts |
| Polyvinylacetate (softening point: 80° C.) | 6.0 parts |
| Butyl/methylmethacrylate (Tg: 80° C.) | 8.0 parts |
| Ethylmethacrylate resin (Tg: 63° C.) | 3.0 parts |
| Methacrylate copolymer (Tg: 80° C.) | 5.0 parts |
| Unsaturated polyester resin (softening point 103° C.) | 3.5 parts |
| Silicon dioxide | 3.5 parts |

Instead of that hot stamping film it is also possible to use another transfer film. It can be of a corresponding structure to the described hot stamping film.

Transfer films—in the specific case here hot stamping films—are preferably applied in a conventional manner to a substrate and more specifically in such a way that the adhesive layer 6 faces towards the substrate surface. In the hot stamping operation the adhesive layer 6 then forms an adhesive bond to the surface of the substrate. The carrier film 1 is then pulled off—after softening of the release layer 2 under the effect of heat in the hot stamping operation. With the hot stamping film applied to the surface of the substrate in that way the protective layer 3 then forms the upper surface of the stamping film, which is remote from the substrate.

Figure 2:
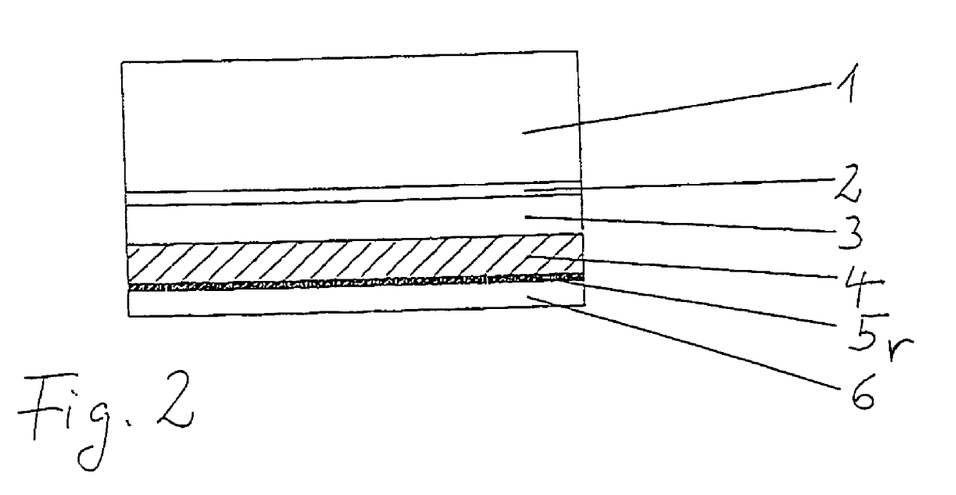
Figure 3:
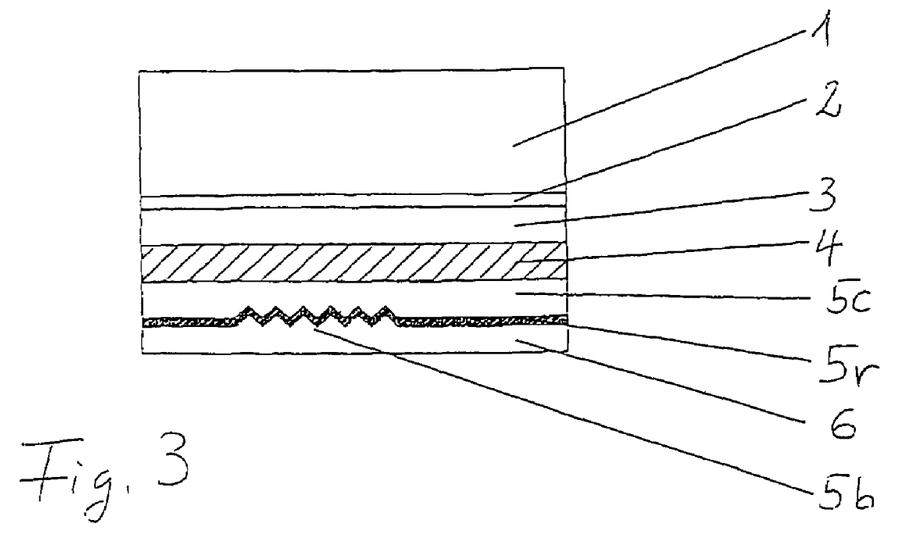
Figure 4:
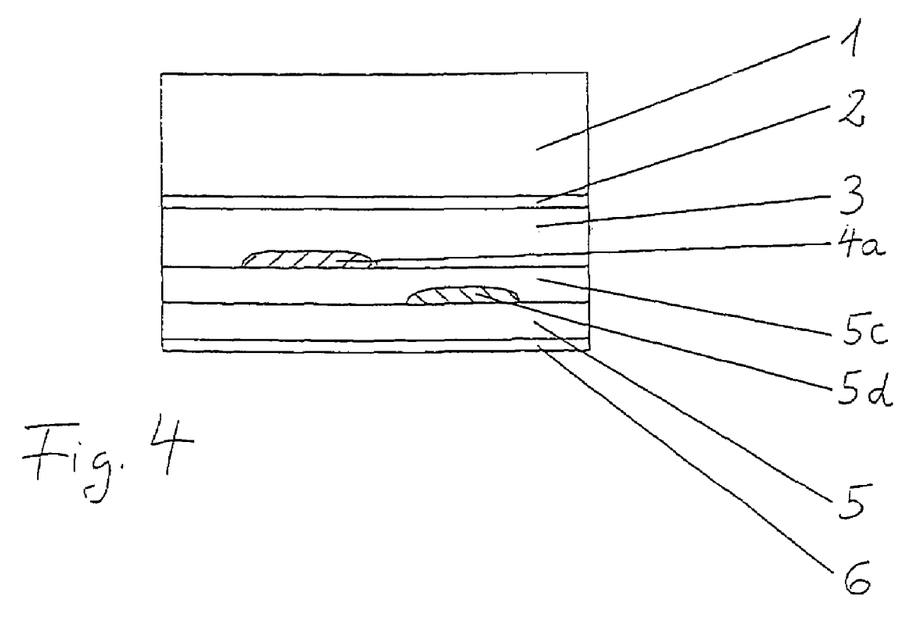

The hot stamping films shown in FIGS. 2 through 4 have a background layer which is of a different nature from the film shown in FIG. 1. In the example shown in FIG. 2 the background layer is in the form of a reflection layer 5r. In a special case the reflection layer is in the form of a metallic reflection layer. The reflection layer can be transparent or partially transparent for given spectral ranges. It can have a higher refractive index than the other layers and therefore has increased reflection of light. The example shown in FIG. 3 has a layer 5c as an additional lacquer layer which is preferably transparent. There is also a reflection layer 5r which has a diffraction or hologram structure 5b in region-wise manner. In the embodiment of FIG. 3 that structure 5b is in the form of a constituent of the lacquer layer 5c and the adhesive layer 6 as well as the interposed layer. Alternatively or in addition a diffraction structure can also be provided as a constituent of the lacquer layer 5c and/or the laser-sensitive color lacquer layer 4 and/or the adhesive layer 6. In these cases the diffraction structure can be of a region-wise nature, as illustrated, but it can also be in the form of a continuous layer.

In the example shown in FIG. 4 a printed image 5d is arranged in the background layer 5c in a defined region and a defined laser-sensitive region 4a is arranged in laterally displaced relationship with the image in the laser-sensitive layer.

Figure 5:
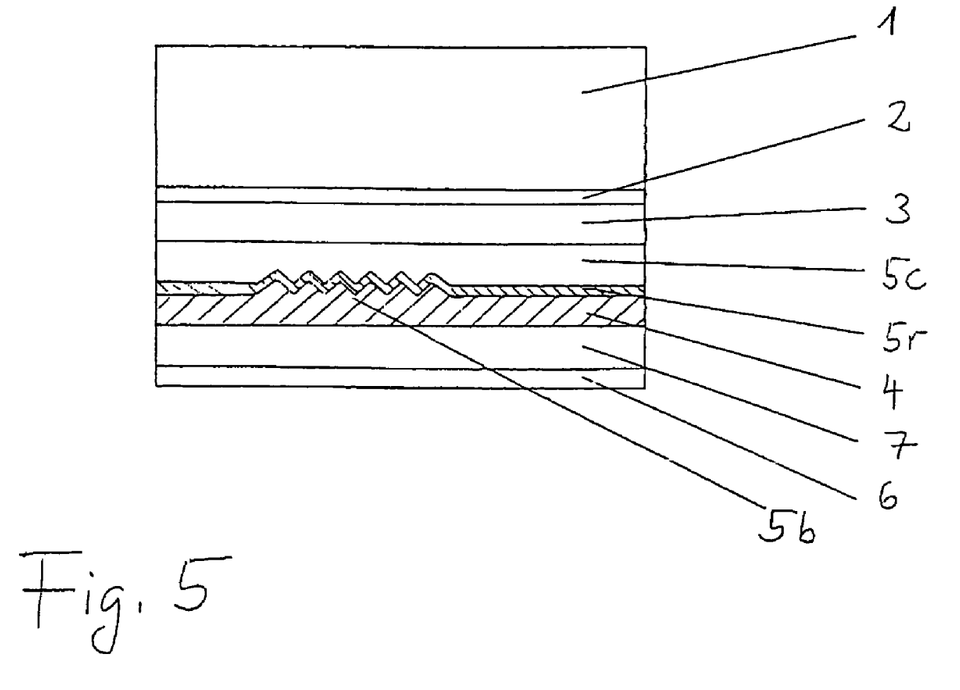

FIG. 5 shows a hot stamping film with a modified layer structure. The layer structure is similar to that in FIG. 3, but in this case the sequence of the layers is modified, more specifically in such a way that the laser-sensitive layer 4 is arranged on the side of the reflection layer 5, which is towards the substrate. The layers are disposed on each other in the following sequence:

A carrier film 1, a release layer 2, a protective layer 3, an intermediate layer 5c, a reflection layer 5, a laser-sensitive layer 4, a background layer 7 and an adhesive layer 6. A diffraction structure 5b is provided in the mutually adjoining regions of the laser-sensitive layer 4, the reflection layer 5 and the intermediate layer 5c. It can be in the form of a diffraction grating. Alternatively the structure 5b can also be in the form of a hologram structure. In the embodiment illustrated by way of example in FIG. 5 the diffraction structure 5b is produced in manufacture of the film, by a procedure whereby the diffraction structure is firstly impressed into the intermediate layer 5c, and then the reflection layer 5r is applied for example by vapor deposition. The reflection layer 5 is in the form of a smooth reflection layer 5r in the portions outside the diffraction structure. It is preferably of a layer thickness of <1 µm. It is transparent or partially transparent at least for given spectral ranges, at given viewing angles. After application of the reflection layer 5r the laser-sensitive layer 4 is produced. The diffraction structure 5b produced in that way is formed in the directly mutually adjoining regions of the layers 5c and 4. When the diffraction structure is viewed varying optical effects are produced in dependence on the lighting and viewing angles.

In the case of the film in FIG. 5a the layers occur in the following sequence: carrier layer 1, release layer 2, protective layer 3, laser-sensitive layer 4, reflection layer 5r, laser-sensitive layer 4, additional lacquer layer 7 and adhesive layer 6. The laser-sensitive layers 4 which are disposed on both sides of the reflection layer 5r can be identical, that is to say the reflection layer is then arranged in that laser-sensitive overall layer. The laser-sensitive layers however may also be different. A diffraction structure 5b is provided in mutually adjoining regions of the laser-sensitive layers 4 and the reflection layer 5r. Alternatively the structure 5b may also be in the form of a hologram structure. In this embodiment, enhanced safeguards against forgery are afforded by the fact that two laser-sensitive layers adjoin the diffraction or hologram structure, and they can be the same or different. In this arrangement the lacquer layer 7 which is optional is in the form of a transparent layer or a bright backup layer. Alternatively the lacquer layer 7 and the adhesive layer 6 may also be omitted and the second laser-sensitive layer 4 shown in FIG. 5a under the reflection layer 5r may be in the form of a laser-sensitive adhesive layer.

In the case of the film in FIG. 5b the layers occur in the following sequence: carrier film 1, release layer 2, laser-sensitive layer 4, additional lacquer layer 5c, reflection layer 5r and adhesive layer 6. The layers 5c and 6 can be of identical material or of different materials. In this embodiment the laser-sensitive layer 4 is a protective lacquer layer which is laser-sensitive insofar as it contains the appropriate comparable pigments. A diffraction structure is formed in the mutually adjoining regions of the additional lacquer layer 5c, the reflection layer 5r and the adhesive layer 6. The diffraction structure can be in the form of a diffraction grating. Alternatively the structure 5b may also be in the form of a hologram structure.

After the transfer film, in the present case a stamping film, has been applied to the substrate, the laser treatment is effected to produce transparent and/or colored markings in the laser-sensitive layer 4. In order to produce a given marking, preferably color marking, at a given position in the laser-sensitive layer 4, that location is irradiated with laser radiation.

In the case of the laser treatment of a film having the layer structure shown in FIG. 5 laser irradiation is effected through the reflection layer inclusive of the diffractive structure 5b. The laser beam is preferably directed perpendicularly on to the plane of the film from above. The reflection layer 5r is transmissive in respect of the laser radiation, in particular when it is directed perpendicularly thereonto. The grating or hologram structure 5b of the layer forming the reflection layer 5r in the rest of the region is transmissive of the laser radiation, but in this respect the radiation can also be reflected more or less and in part at the diffraction structure. The laser-sensitive layer 4 which is arranged under the layer forming the reflection layer 5r in the rest of the region still within the diffraction structure 5b and therebeneath is altered by the effect of the laser insofar as a change in color is produced by bleaching at the given location.

The bleaching operation as takes place in the illustrated embodiments in the respective laser-sensitive layer is described hereinafter.

In the bleaching procedure, a blue or green or red color marking is produced in a first step, insofar as that location is irradiated with a given laser wavelength with which a given pigment component is bleached.

In order to produce the color blue only the yellow pigment component may be bleached. Blue laser light is used for that purpose. A given minimum intensity is required for the bleaching operation. In addition a certain pulse duration may not be exceeded. In order to obtain a green color marking in the first step only the magenta pigment component may be bleached. Green laser light is used for that purpose. In order to obtain a red marking in the first step only the cyan pigment component may be bleached. Red laser light is used for that purpose.

In order to produce a color marking of the color cyan or magenta or yellow at that location, that location is subjected to laser treatment in a second step, more specifically with a laser wavelength with which one of the pigment components which is not yet bleached at that location is bleached. If a blue color marking has been produced in the first step, the cyan pigment component and the magenta pigment component are unbleached at that location. In order to produce the color cyan at that location the magenta pigment component must be bleached in this second step. That is effected with green laser light. That therefore produces a cyan-colored marking at that location.

If a magenta-colored marking is to be obtained in that second step instead of the cyan-colored marking, the blue color marking produced in the first step must be treated with red laser light. That causes the cyan pigment to be bleached at that location so that therefore the magenta pigment remains unbleached at that location. That therefore gives the magenta-colored marking at that location.

In a corresponding manner, a cyan-colored marking or a yellow-colored marking may be produced from a green color marking which was produced in the first step and which was formed from unbleached cyan pigment and yellow pigment that had remained there, that operation being effected more specifically by treatment with blue laser light and red laser light respectively.

In a corresponding manner, a red color marking produced in the first step can be converted in the second step into a yellow or magenta-colored marking, more specifically by laser treatment in the second step with green laser light and blue laser light respectively.

In order to produce, at the location treated in the first and second steps, a transparent location, that is to say a white location if the background layer 5 is white, that location must be treated in a third step with a laser beam whose wavelength is so set that the pigment component which has remained unbleached at that location after the second step is bleached, that is to say the yellow color marking must be bleached with blue light, the magenta-colored marking with green light and the cyan-colored marking with red laser light.

In the same manner, further adjacent locations are then treated in the laser-sensitive layer 4 in order to produce further color markings in the layer 4 of the stamping film. A full-color image can be produced in that way.

Laser treatment can also be used to produce color markings or a full-color image in the coloring agent or agents in the laser-sensitive layer by a color reversal. The laser treatment can be effected in a corresponding manner with successive process steps. Pigments fall to be considered as the coloring agents, that is to say color-imparting substances. They are mostly insoluble and they generally involve inorganic substances. However mostly soluble, organic coloring agents are considered as the coloring agents. The color change is effected in each case under specific laser conditions which are then applied in the individual steps in the laser treatment.

The laser treatment of the transfer film for producing the color markings can also alternatively be effected prior to application of the film, more specifically in particular if the protective layer 3 is in the form of a layer which is not or is only partially transparent for laser radiation or a layer which is not transparent for laser radiation in the given wavelength range, or if there is provided an additional UV-absorbent protective layer. The laser treatment is then effected prior to application of the film by a procedure whereby the laser beam is directed on to the rear side of the film, that is to say on to the background layer 5 or the adhesive layer 6, and thus the laser-sensitive layer 4 is therefore treated from the other side in order to produce the color markings therein in the same manner. The background layer 5 and the adhesive layer 6 are transparent or at least partly transparent for the laser radiation in question, in relation to such uses.

Color markings can also be produced in laminating films in a corresponding manner. Such laminating films are shown in FIGS. 6 through 10. The laminating film in FIG. 6 includes a so-called overlay film 30, an optional intermediate layer 31, a laser-sensitive layer 40, an intermediate layer 50 which forms a background layer and which is also optional, and an adhesive layer 60 which is also optional. In the laminating operation the laminating film is applied to the substrate with the adhesive layer 60 towards the surface of the substrate. An adhesive bond to the surface of the substrate is produced by way of the adhesive layer 60. The overlay film 30 then forms the upper protective layer whose surface that is remote from the substrate forms the outer surface of the film. The overlay film 30 therefore remains applied there after application of the laminating film. It corresponds to the protective layer 3 of the stamping film in FIG. 1. The laser-sensitive layer 40 corresponds to the laser-sensitive layer 4, that is to say the first lacquer layer 4 of the stamping film in FIG. 1. The intermediate layer 50 corresponds to the background layer 5, that is to say the second lacquer layer 5 of the stamping film in FIG. 1. The adhesive layer 60 corresponds to the adhesive layer 6 of the stamping film in FIG. 1. The laminating films in FIGS. 7 and 8 represent modifications of the laminating film in FIG. 6, in which the background layer is modified in a corresponding manner to the background layer in the hot stamping films in FIGS. 2 and 3.

Figure 6:
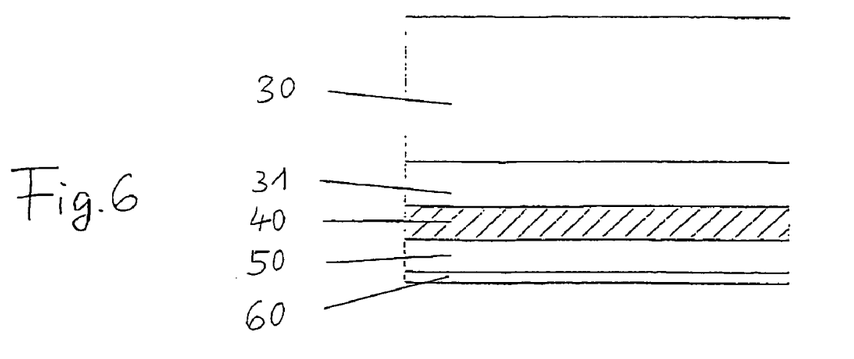
FIGS. 6 through 10 show sectional views of various laminating films each with a laser-sensitive layer.
Figure 7:
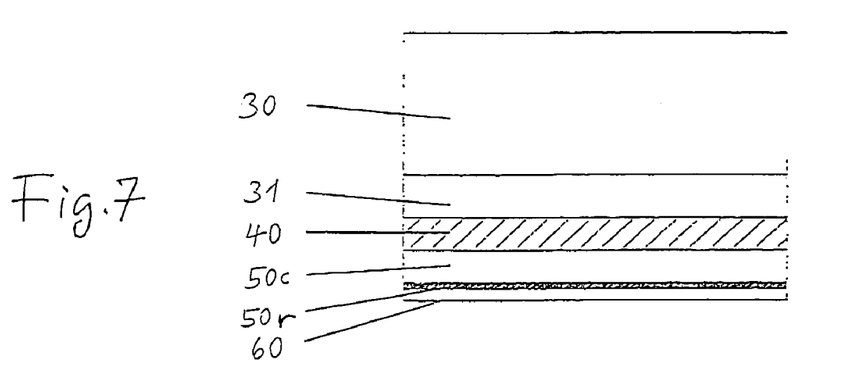
Figure 8:
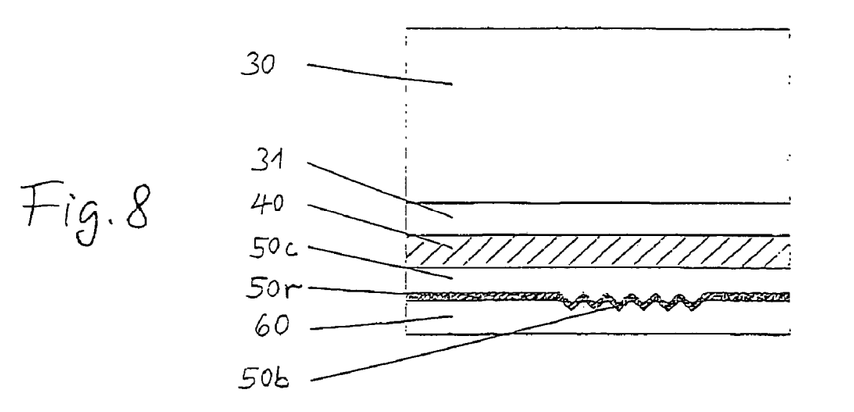
Figure 9:
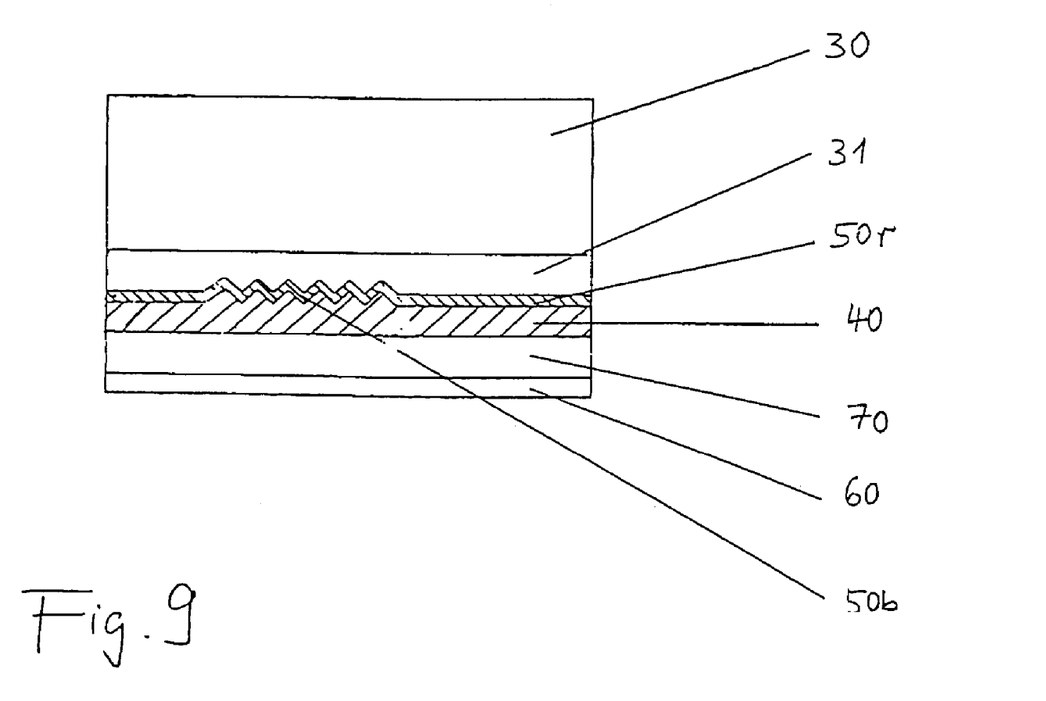

The laminating film in FIG. 9 involves a layer structure with a sequence of the mutually superposed layers, which is modified in relation to FIGS. 6 through 8. The sequence of the layers corresponds to the structure of the hot stamping film in FIG. 5. In this case the layer 70 is an optional background layer.

Figure 5A:
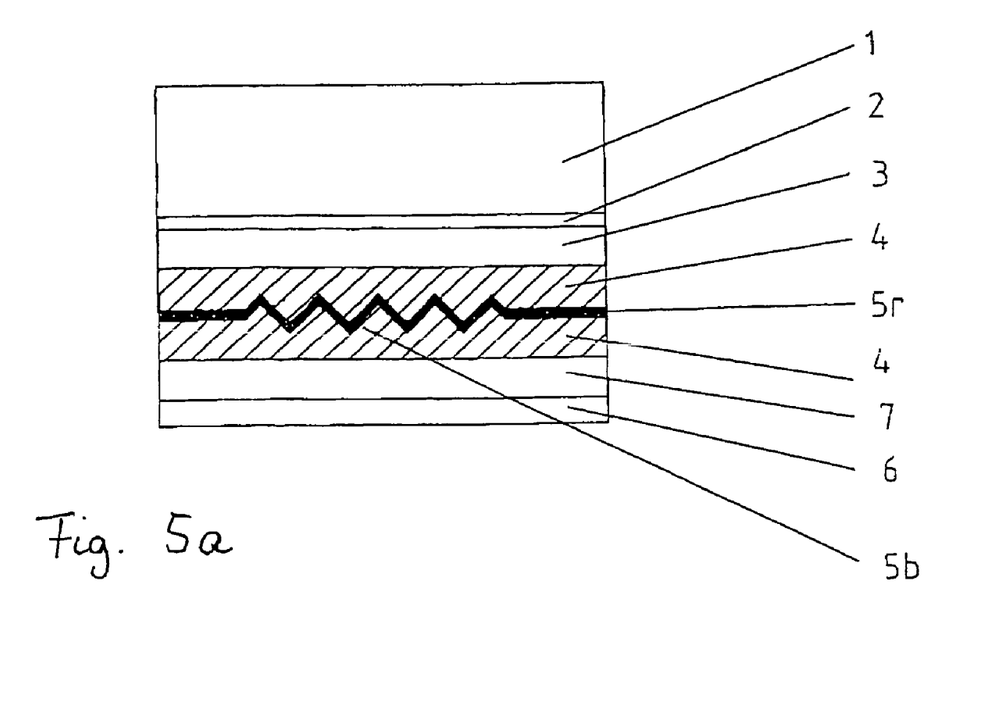
Figure 5B:
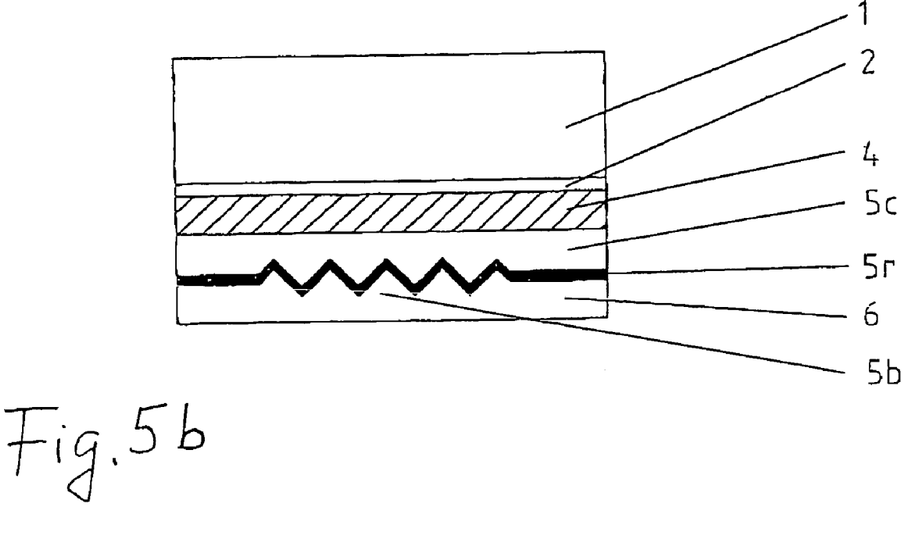
Figure 9A:
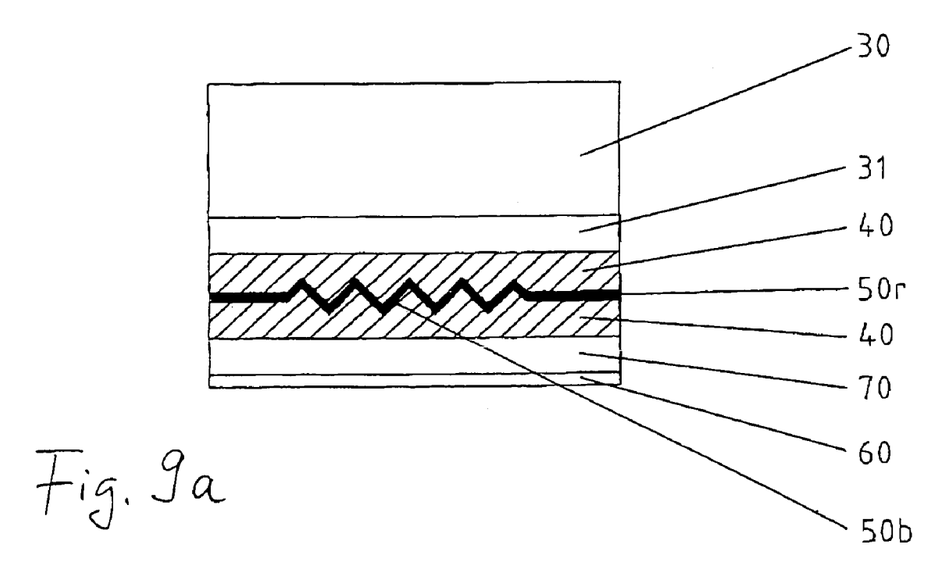

FIG. 9a shows an embodiment which is modified in comparison with the embodiment in FIG. 9, with a sequence of the layers corresponding to the structure of the hot stamping film in FIG. 5a.

Figure 10:
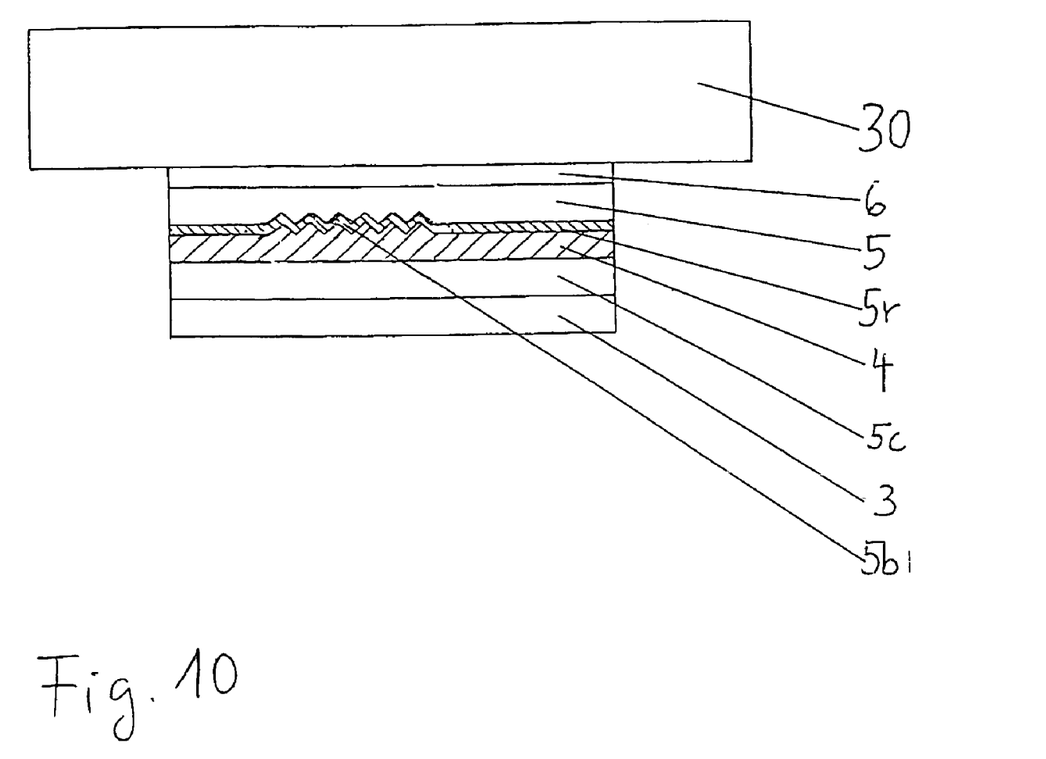

The laminating film in FIG. 10 represents a modification of the laminating film in FIG. 9. In this embodiment the overlay film 30 is provided with a hot stamping film applied thereto. That hot stamping film applied at that location replaces the layers 31, 50 and 50r, 40, 70 and 60 which are provided in the laminating film in FIG. 9, by the corresponding layers of the hot stamping film. In the case of the hot stamping film used for production of that laminating film, unlike the stamping film in FIG. 5, the reflection layer 5r and the laser-sensitive layer 4 are arranged in the reverse sequence so that, in the case of the laminating film in FIG. 10, the reflection layer 5r is now arranged on the side of the laser-sensitive layer 4, which is remote from the substrate, in a corresponding manner to the laminating film in FIG. 9.

In the same manner as in the other illustrated embodiments the diffraction structure 5b in the laminating film in FIG. 10 is also provided in the mutually adjoining regions of the layers 4 and 5. In this arrangement the lacquer layer 5 is in the form of a transparent layer.

Figure 10A:
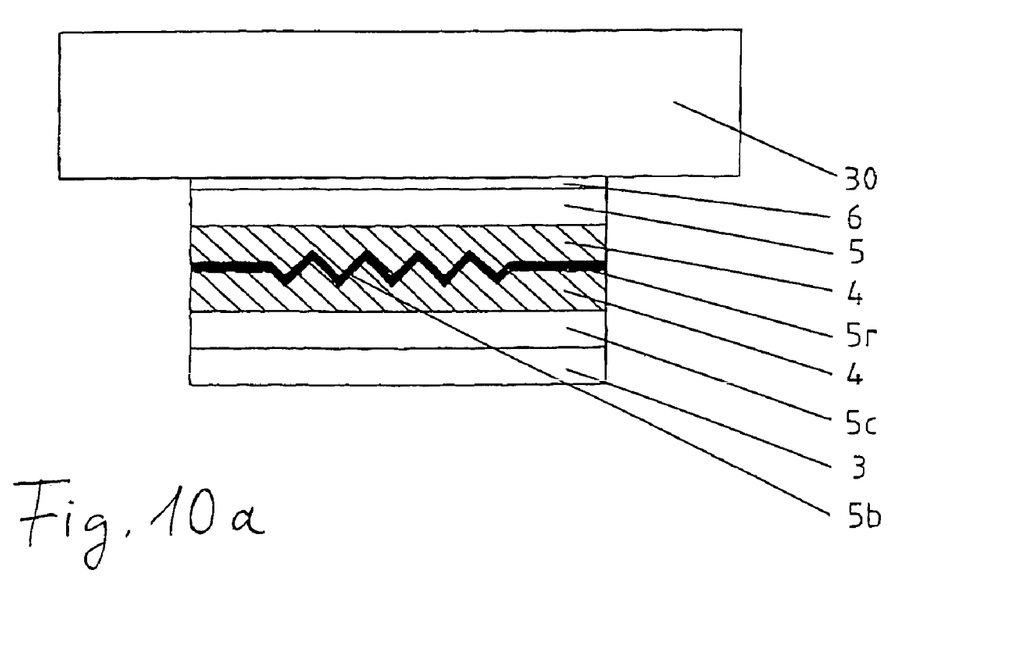

The laminating film in FIG. 10a is of a similar structure to the laminating film in FIG. 10. In the embodiment in FIG. 10a however the overlay film 30 is provided with a hot stamping film applied thereto, which is of a similar structure to the hot stamping film of the embodiment in FIG. 5a. That hot stamping film which is applied to the overlay film 30 replaces the layers 31, 40, 50, 50r, 40, 70 and 60 which are provided in the laminating film in FIG. 9a, by the corresponding layers of the hot stamping film. The laminating film in FIG. 10a involves a series of layers in the following sequence: overlay film 30, adhesive layer 6, optional lacquer layer 5, laser-sensitive layer 4, reflection layer 5r, laser-sensitive layer 4, additional lacquer layer 5c and protective layer 3. The laser-sensitive layers 4 on both sides of the reflection layer 5r can be identical, that is to say the reflection layer 5r is then arranged in that laser-sensitive overall layer. The laser-sensitive layers 4 however may also be different. In that case the lacquer layer 5 is in the form of a transparent layer or a bright backup layer.

Figure 10B:
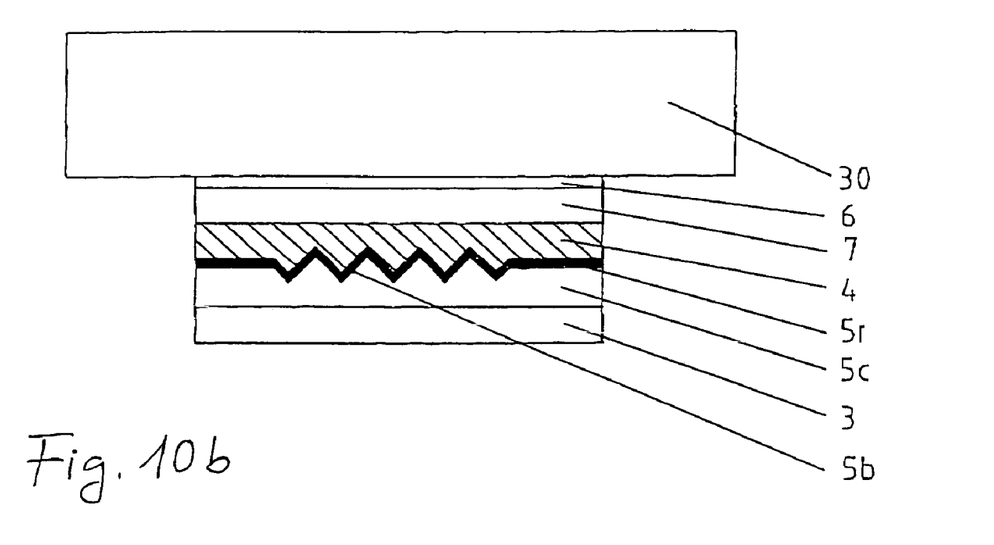

The laminating film in FIG. 10b represents an embodiment in which a hot stamping film is also applied on the overlay film 30. That applied hot stamping film is of a similar configuration to the film in FIG. 5. It replaces the layers 31, 40, 50 and 50r, 40, 70 and 60 respectively provided in the laminating film in FIG. 9a by the layers of the hot stamping film. The laminating film in FIG. 10b has a series of layers involving the following sequence: overlay film 30, adhesive layer 6, optional lacquer layer 7, laser-sensitive layer 4, reflection layer 5r, additional lacquer layer 5c and protective layer 3. In this case the lacquer layer 7 is in the form of a transparent layer or a bright backup layer.

The laser treatment of the laminating foil is implemented in a corresponding manner to that described for the transfer film, that is to say by appropriate successive bleaching of the pigments or other coloring agents contained in the laser-sensitive layer 40 or by corresponding color changes of the pigments or other coloring agents.

The invention claimed is:

1. A process for producing a multi-color image on or in a plastic body, wherein at least a part of the body comprises a coloring agent mixture which is composed of at least three different components, wherein each of the components is in the form of a pigment or other coloring agent and is bleachable by means of laser under laser conditions which are specific to the respective component, wherein with respect to each of the three components, under the laser conditions which are specific to a component, the other components are not or are substantially not bleachable and a component is a cyan coloring agent, and/or a component is a magenta coloring agent, and/or a component is a yellow coloring agent, wherein in a first step by laser irradiation of a location of the plastic body under laser conditions which are specific to one of the three components only the one component is bleached and that in a second step by laser irradiation of the same location of the body under laser conditions which are specific to a further one of the three components only that further component is bleached, wherein the color magenta is formed by the magenta coloring agent by bleaching of the yellow coloring agent in one step and the cyan coloring agent in another step;
and/or
the color cyan is formed by the cyan coloring agent by bleaching of the magenta coloring agent in one step and the yellow coloring agent in another step;
and/or
the color yellow is formed by the yellow coloring agent by bleaching of the magenta coloring agent in one step and the cyan coloring agent in another step.

2. A process as set forth in claim 1, wherein in a third step by laser irradiation of the same location of the plastic body under laser conditions which are specific to another further one of the three components at the same location of the plastic body only said other further component is bleached.

3. A process as set forth in claim 1, wherein in an n-th step by laser treatment of the same location of the plastic body under laser conditions which are specific to an n-th further component only said n-th component is bleached, wherein n is greater than 3.

4. A process as set forth in claim 1, wherein all components are bleached by the laser irradiations of said location of the body.

5. A process as set forth in claim 1, wherein the bleaching is adjusted in the laser irradiation operation by control of the laser conditions.

6. A process as set forth in claim 5, wherein laser conditions comprise a laser intensity and/or a pulse duration and/or an irradiation time.

7. A process as set forth in claim 1, wherein at least one of the components has a color change in the laser irradiation operation.

8. A process as set forth in claim 1, wherein the plastic body is laser-irradiated successively at a plurality of locations.

9. A process as set forth in claim 1, wherein the laser irradiation produces at said location of the body a color which is formed by the components or coloring agents remaining at said location.

10. A process as set forth in claim 1, wherein at the one location of the plastic body a plurality of different components and preferably all different components are arranged mixed and the color of said location is formed by subtractive color mixing.

11. A process as set forth in claim 1, wherein red laser light is used for bleaching the cyan coloring agent and/or green laser light is used for bleaching the magenta coloring agent and/or blue laser light is used for bleaching the yellow coloring agent.

12. A process as set forth in claim 11, wherein the color blue is formed by superimposition, preferably subtractive mixing of the colors cyan and magenta, preferably from the coloring agent mixture with cyan coloring agent, magenta coloring agent and yellow coloring agent by bleaching of the yellow coloring agent;
and/or
the color green is formed by superimposition, preferably subtractive mixing of the colors cyan and yellow, preferably from the coloring agent mixture with cyan coloring agent, magenta coloring agent and yellow coloring agent by bleaching of the magenta coloring agent;
and/or
the color red is formed by superimposition, preferably subtractive mixing of the colors yellow and magenta, preferably from the coloring agent mixture with magenta coloring agent, yellow coloring agent and cyan coloring agent by bleaching of the cyan coloring agent;
and/or
black or gray is formed by superimposition, preferably subtractive mixing of the colors cyan, magenta and yellow, preferably from the coloring agent mixture with magenta coloring agent, yellow coloring agent and cyan coloring agent;
and/or
the color magenta is formed by the magenta coloring agent by bleaching of the coloring agents present in the coloring agent mixture apart from the magenta coloring agent, preferably from the coloring agent mixture including magenta coloring agent, yellow coloring agent and cyan coloring agent, by bleaching of the yellow coloring agent and the cyan coloring agent;
and/or
the color cyan is formed by the cyan coloring agent by bleaching of the other coloring agents in the coloring agent mixture apart from the cyan coloring agent, preferably from the coloring agent mixture including cyan coloring agent, yellow coloring agent and magenta coloring agent, by bleaching of the magenta coloring agent and the yellow coloring agent;
and/or
the color yellow is formed by the yellow coloring agent by bleaching of all coloring agents in the coloring agent mixture apart from the yellow coloring agent, preferably from the coloring agent mixture including yellow coloring agent, magenta coloring agent and cyan coloring agent, by bleaching of the magenta coloring agent and the cyan coloring agent.

13. A process as set forth in claim 1, wherein the plastic body is a film.

14. A process as set forth in claim 13, wherein the film is a transfer film.

15. A process as set forth in claim 14, wherein the transfer film is a hot stamping film or a laminating film.

16. A process as set forth in claim 1, wherein the cyan coloring agent is a cyan pigment, the magenta coloring agent is a magenta pigment and the yellow coloring agent is a yellow pigment.

* * * * *